United States Patent
Davis

(10) Patent No.: US 7,589,427 B2
(45) Date of Patent: Sep. 15, 2009

(54) ROADWAY POWER GENERATING SYSTEM

(76) Inventor: Rufus Davis, 1535 N. Post Oak, Houston, TX (US) 77055

( * ) Notice: Subject to any disclaimer, the term of this patent is extended or adjusted under 35 U.S.C. 154(b) by 56 days.

(21) Appl. No.: 11/461,724

(22) Filed: Aug. 1, 2006

(65) Prior Publication Data
US 2007/0181372 A1  Aug. 9, 2007

Related U.S. Application Data

(60) Provisional application No. 60/704,490, filed on Aug. 1, 2005.

(51) Int. Cl.
*F03G 3/00* (2006.01)
(52) U.S. Cl. .................................. 290/1 R
(58) Field of Classification Search .............. 290/1 R
See application file for complete search history.

(56) References Cited

U.S. PATENT DOCUMENTS

| | | | | |
|---|---|---|---|---|
| 1,916,873 A | * | 7/1933 | Wiggins | 185/39 |
| 4,173,431 A | * | 11/1979 | Smith | 417/229 |
| 4,238,687 A | * | 12/1980 | Martinez | 290/1 R |
| 4,239,974 A | * | 12/1980 | Swander et al. | 290/1 R |
| 4,418,542 A | * | 12/1983 | Ferrell | 60/668 |
| 4,614,875 A | * | 9/1986 | McGee | 290/1 R |
| 4,739,179 A | * | 4/1988 | Stites | 290/1 R |
| 4,980,572 A | * | 12/1990 | Sen | 290/1 R |
| 6,172,426 B1 | * | 1/2001 | Galich | 290/1 R |
| 6,204,568 B1 | * | 3/2001 | Runner | 290/1 R |
| 6,858,952 B2 | * | 2/2005 | Gott et al. | 290/1 R |
| 6,949,840 B2 | * | 9/2005 | Ricketts | 290/1 R |
| 7,067,932 B1 | * | 6/2006 | Ghassemi | 290/1 R |
| 7,102,244 B2 | * | 9/2006 | Hunter, Jr. | 290/1 R |
| 2003/0034652 A1 | * | 2/2003 | Slatkin | 290/1 R |
| 2004/0066041 A1 | * | 4/2004 | Hunter, Jr. | 290/1 R |
| 2004/0160058 A1 | * | 8/2004 | Gott et al. | 290/1 R |

FOREIGN PATENT DOCUMENTS

| | | | | |
|---|---|---|---|---|
| GB | 2275828 A | * | 9/1994 |
| GB | 2389249 A | * | 12/2003 |
| JP | 56044469 A | * | 4/1981 |
| JP | 56113069 A | * | 9/1981 |
| JP | 2003201954 A | * | 7/2003 |
| WO | WO 8607504 A1 | * | 12/1986 |

* cited by examiner

*Primary Examiner*—Joseph Waks
(74) *Attorney, Agent, or Firm*—Fulbright & Jaworski, L.L.P.

(57) ABSTRACT

A power generating system configured to be placed in a road. The system includes a encasing box that encloses pistons that extend slightly above the encasing box. The pistons are connected to a crank that is connected to an alternator or other power generating device. As cars pass over the pistons, they engage the alternator and generate electricity.

20 Claims, 1 Drawing Sheet

ROADWAY POWER GENERATING SYSTEM

CROSS-REFERENCE TO RELATED APPLICATIONS

This application claims priority to Provisional Application No. 60/704,490.

TECHNICAL FIELD

The present invention relates to a roadway power generating system configured to generate power from vehicles as they pass over the power generating system. The novel system is sized and shaped to be positioned in roads. The system includes pistons positioned to be engaged by car tires. The pistons are connected to alternators. As the pistons are engaged, they turn the alternators to generate electricity. The entire system is housed in an enclosure that can be easily installed and removed.

BRIEF SUMMARY OF THE INVENTION

One embodiment of the present invention is a road power generating system that includes a piston housing, a piston slideably positioned within the piston housing, wherein the piston is disposed in an extended position and is shaped to be engaged by a car tire, a crank pivotally connected to the piston and the piston housing, and an alternator connected to the crank.

The system may further include a spring positioned under the piston to dispose the piston in an extended position, the spring is sized to compress under less than 25% of the weigh of a typical car.

The system may further include a piston rod guide and a piston rod connected to and extending below the piston and slideably positioned within the piston rod guide and connected to the alternator. The piston of the system may include a rounded top that extends beyond the piston housing when the piston is in an disposed in an extended position. The piston's rounded top may also be surrounded by a non-skid surface. The piston's rounded top may be configured to extend beyond said piston housing by approximately ¾ of an inch when in an extended position.

The spring of said system may be sized to turn said alternator when returning the piston to its outwardly disposed position.

The road power generating system may be positioned within an encasement.

Another embodiment road power generator includes an encasement, a piston housing positioned within the encasement, a piston slideably positioned within the piston housing and adapted to extend beyond the piston housing and shaped to be struck by car tires, and an alternator operably connected to the piston and configured to generate electricity when the piston is depressed. The system may further include a crank connecting the piston to the alternator and designed to pivot about the piston housing.

The piston of the embodiment may be configured to extend no more than 2 inches above the piston housing. The road power generator further includes a piston rod connected to the piston and the crank and is in guided relation to a piston rod guide. The system may further include a spring positioned under the piston and sized to compress under the force exerted by a car tire. The piston may be rounded. Further, the distance between the piston housing and the piston rod is less than the distance between the piston housing and the alternator.

The system may further include a compression plate positioned below the spring, wherein the piston rod extends through the compression plate.

A further embodiment includes an encasement, a plurality of pistons slideably engaged within the encasement and extending above the encasement when not compressed, a plurality of actuators positioned within the encasement and connected to the pistons, and a non-skid surface positioned over the encasement. The pistons may be separated from each other by no more than the width of a car tire. The encasement of the system may be embedded within a road. The pistons of the system may be configured to extend no more than 2 inches above the road.

The foregoing has outlined rather broadly the features and technical advantages of the present invention in order that the detailed description of the invention that follows may be better understood. Additional features and advantages of the invention will be described hereinafter which in addition to the above form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention together with further objects and advantages will be better understood from the following description when considered in connection with the accompanying figures. It is to be expressly understood, however, that each of the figures are provided for the purpose of illustration and description only and are not intended to define of the limits of the present invention.

BRIEF DESCRIPTION OF THE DRAWINGS

The advantages, features, and details of the invention are explained in greater detail in the following description of the preferred embodiment, with the aid of drawings as listed below. For a more complete understanding of the present invention, reference is now made to the following descriptions taken in conjunction with the accompanying drawing, in which.

DETAILED DESCRIPTION OF THE INVENTION

Upon review of the detailed description and the accompanying drawings provided herein, it will be apparent to one of ordinary skill in the art that the roadway power generating system can be used in a number of different applications. Accordingly, the present invention is not limited to the structures specifically described and illustrated herein. The disclosed systems, however, are particularly adapted for roadway power generating applications.

Figure 1:
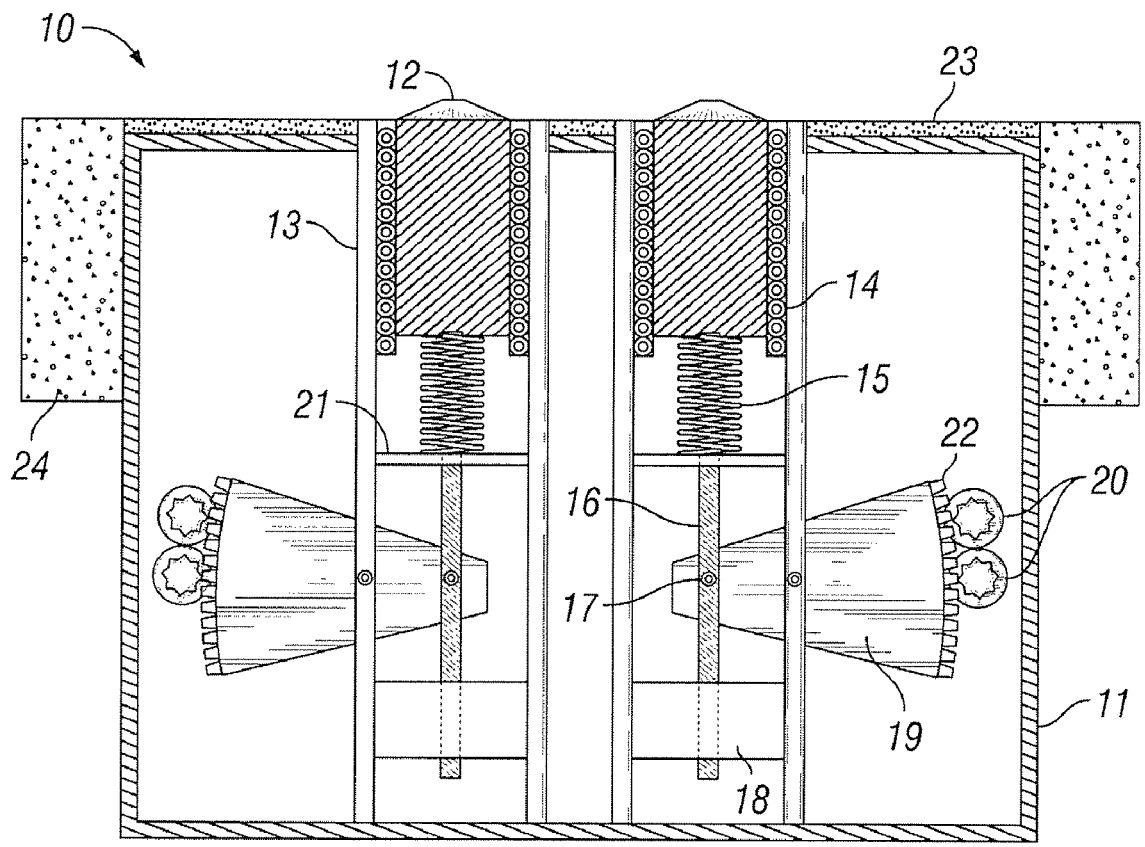
FIG. 1 is a side view of the roadway power generating system.

FIG. 1 shows the preferred embodiment of a roadway power generating system (10) from a side, cutaway view. The system is contained within encasement (11) for convenience. Being fully contained allows the system to be easily moved. Depending on the application, the entire system can be built directly into the road (24) without using an encasement (11).

The system includes piston (12) positioned so that the piston head extends above encasement (11). FIG. 1 shows two pistons (12), but any number can be used. The piston heads are shaped to minimize roughness as car tires roll over them. As such, they can be angled (as shown) or rounded. The roughness of the system is further minimized by limiting the amount the piston head extends above the encasement (11). Generally, less than two inches is preferred. Ideally, piston (12) protrudes approximately ¾ of an inch above the road. Although pistons are shown exposed to direct tire strikes, they may be covered by a relatively stiff cover. When covered in this manner, the car tire passes over the cover material, which in turn depresses the pistons.

Pistons (12) are retained within piston housing (13). Piston housing (13) secures pistons (12) within the system (10) and more precisely constrains their movement to vertical movement. Pistons (12) are shown surrounded by bearings (14). Although bearings are shown, other means such as lubricant can be used to reduce resistance between pistons (12) and piston housing (13).

Pistons (12) are shown in an outward, extended position. They are extended by springs (15) positioned beneath each piston. Springs (15) are sized according to the load required to move alternators (20). Although single springs are shown below each piston, any number of methods can be used to extend pistons (12). For example, multiple springs, rubber bushings, compressed air, or combinations thereof can be used.

Springs (15) are braced by compression plate (21). The compression plate (21) is positioned beneath springs (15) and receives the load from springs (15). Compression plate (21) also prevents dust and other debris from entering the lower part of system (10).

Piston (12) is connected to piston rod (16). Piston rod (16) extends below piston (12), through spring (15), compression plate (21) and piston rod guide (18).

Attached to piston rod (16) is crank (19). Crank (19) is rotationally attached to piston rod hosing (13). FIG. 1 shows a cut-away view of piston (12) and piston housing (13). In actuality, crank (19) extends within piston housing (13) through a slot or cut-out (not shown). Crank (19) is shown attached to piston rod (16), but could be attached directly to piston (12). Crank (19) is positioned to engage an alternator or other electrical power generating device (20), hereafter "alternator." Crank (19) is designed to provide greater relative movement at end (22) than the end attached to piston rod (16). In this manner, small movements of the piston rod (16) result in relatively large movement of end (22). Although in a preferred embodiment this is accomplished with crank (19), it could also be accomplished through gearing or other mechanical leverage. Additionally, one crank (19) is shown attached to piston (12), but multiple cranks could be attached. For example, the length of piston rod (16) could be extended to accommodate multiple cranks.

Encasement (11) is covered by non-skid surface (23). Non-skid surface (23) is shown with holes for pistons (12) and piston housing (13), but could be a uniform coating.

Figure 2:
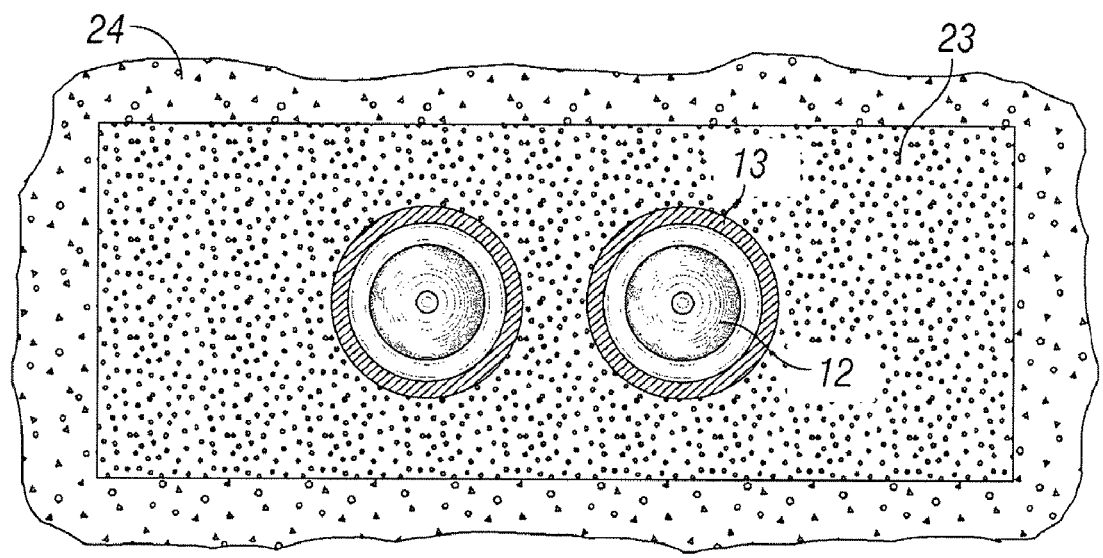
FIG. 2 is a top view of the roadway power generating system.

FIG. 2 shows a top view of system (10). System (10) is shown with two pistons (12), but could be configured with any number of pistons. The spacing between pistons as shown in FIG. 2 or between two adjacent systems (10) is ideally less than the width of an average car tire. The system (10) is positioned in travel lanes where the highest traffic and tire contact occurs.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the vehicles and the methods described in the specification. Accordingly, the appended claims are intended to include within their scope such articles and/or methods.

What is claimed is:

1. A road power generating system comprising,
   a piston housing;
   a piston slideably positioned within said piston housing, wherein said piston is disposed in an extended position and shaped to be engaged by a car tire;
   a crank pivotally connected to said piston at a first pivot point and said piston housing at a second pivot point, wherein said first pivot point moves in a fixed axial relation with said piston; and
   an alternator connected to said crank.

2. The road power generating system of claim 1, further comprising a spring positioned under said piston to dispose said piston in an extended position, said spring sized to compress under less than 25% of the weigh of a typical car.

3. The road power generating system of claim 2, further comprising
   a piston rod guide; and
   a piston rod extending below said piston and slideably positioned within said piston rod guide and connected to said piston and said alternator.

4. The road power generating system of claim 3, wherein said piston has a rounded top that extends beyond said piston housing when said piston is in an extended position.

5. The road power generating system of claim 4, wherein said piston's rounded top is surrounded by a non-skid surface.

6. The road power generating system of claim 5, wherein said piston's rounded top extends beyond said piston housing by approximately ¾ of an inch when said piston is in an extended position.

7. The road power generating system of claim 6, wherein said spring is sized to turn said alternator when returning said piston to its outwardly disposed position.

8. The road power generating system of claim 7, further comprising an encasement, wherein said piston housing, crank, and alternator are positioned within said encasement.

9. A road power generator comprising,
   an encasement;
   a piston housing positioned within said encasement;
   a piston slideably positioned within said piston housing and adapted to extend beyond said piston housing and shaped to be struck by car tires;
   a crank pivotally connected to said piston, wherein said crank pivots about a point that maintains a fixed axial relation to said piston;
   an alternator operably connected to said crank and configured to generate electricity when said piston is depressed.

10. The road power generator of claim 9, further comprising,
    a crank connecting said piston to said alternator and designed to pivot about said piston housing.

11. The road power generator of claim 10, wherein said piston extends no more than 2 inches above said piston housing.

12. The road power generator of claim 11, wherein said piston includes a piston rod in guided relation to a piston rod guide.

13. The road power generator of claim 12, further including a spring positioned under said piston and sized to compress under the force exerted by a car tire.

14. The road power generator of claim 13, wherein the portion of said piston that extends beyond the piston housing is rounded.

15. The road power generator of claim 14, wherein the distance between said piston housing and said piston rod is less than the distance between said piston housing and said alternator.

16. The road power generator of claim 15, further comprising a compression plate positioned below said spring, wherein said piston rod extends through said compression plate.

17. A system of generating road power comprising;
   an encasement;
   a plurality of pistons slideably engaged within said encasement and extending above said encasement when not compressed;
   a plurality of arms positioned within said encasement and connected to said pistons to mechanically amplify the movement of said pistons, wherein the connection points between said plurality of arms and said pistons moves in fixed axial relation with said pistons; and
   a non-skid surface positioned over said encasement.

18. The system of generating road power of claim 17, wherein said plurality of pistons are separated from each other by no more than the width of a car tire.

19. The system of generating road power of claim 17, wherein said encasement is embedded within a road.

20. The system of generating road power of claim 19, further comprising said pistons extend no more than 2 inches above the road.

* * * * *